(No Model.)

W. WEDEKIND.
KNIFE.

No. 516,671. Patented Mar. 20, 1894.

Witnesses:
W. T. Cornelius
A. C. Cornelius

Inventor.
William Wedekind
by Abt. L. Tutor
Atty.

THE NATIONAL LITHOGRAPHING COMPANY,
WASHINGTON, D. C.

UNITED STATES PATENT OFFICE.

WILLIAM WEDEKIND, OF HAGERSTOWN, INDIANA.

KNIFE.

SPECIFICATION forming part of Letters Patent No. 516,671, dated March 20, 1894.

Application filed September 12, 1892. Serial No. 445,696. (No model.)

*To all whom it may concern:*

Be it known that I, WILLIAM WEDEKIND, a citizen of the United States, and a resident of Hagerstown, in the county of Wayne and State of Indiana, have invented certain new and useful Improvements in Knives for Farriers' Use; and I declare hereby that the following is a clear, full, and exact description of the invention, which will enable others skilled in the art to which it appertains to make and use the same.

The objects of the invention are to provide a simple, cheap and efficient handle adapted to receive and securely hold detachable blades which may have any of the ordinary forms or special forms necessary to operate on different conditions of work to be accomplished, as will be more fully shown in the specification and pointed out in the claim.

Figure 1:
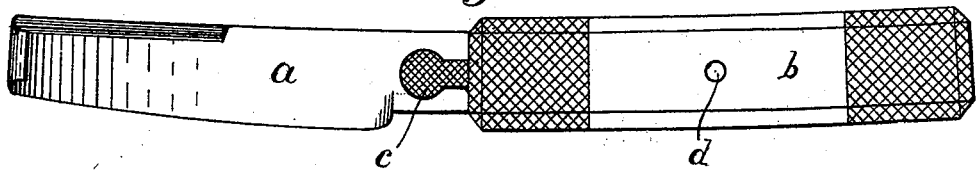
Figure 2:
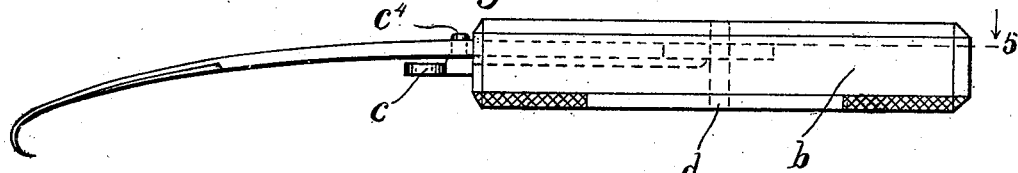
Figure 3:
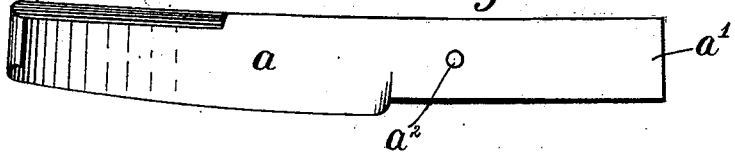
Figure 4:
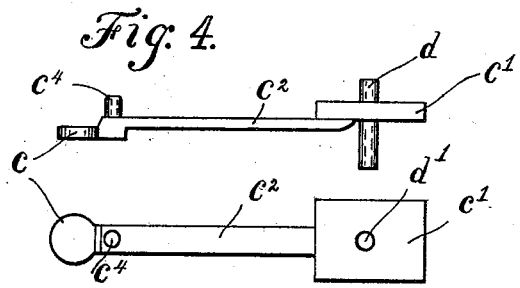
Figure 5:
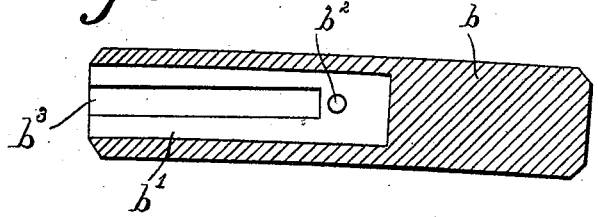

Figure 1 is a side view of my knife complete; Fig. 2 an edge or back view of the knife. Fig. 3 is a side view of the blade. Fig. 4 is an edge and side view of the spring keeper and retaining block. Fig. 5 is a longitudinal section of handle on line 5 looking in direction of arrow.

$a$ is the blade.

$b$ is the handle.

$c$ is a spring-keeper.

$c'$ is the pin block to which is secured bar $c^3$ of keeper $c$.

$d$ is a pin to secure blade to handle.

The blade is provided with a parallel shank $a'$. The handle $b$ is provided with a longitudinal opening $b'$ of such size in cross section as to receive shank $a'$ of said blade as well as the pin block $c'$. $b^3$ is a gain in one side of said opening adapted to receive elastic stem $c^2$ of keeper $c$ which is secured centrally to side of block $c'$. Keeper $c$ is provided with a short pin $c^4$ adapted to engage with hole $a^2$ in blade. The pin block $c'$ is provided with a hole $d'$ in center, and handle $b$ is also provided with a hole $b^2$ which ranges with hole $d'$ when parts are all in place so that pin $d$ may be inserted into them holding them firmly together as seen in Figs. 1 and 2. Thus it is seen that when blade $a$ is placed with hole $a^2$ engaging with pin $c^4$ the end $a'$ of blade will butt against pin block $c'$ and when in this position they are thrust into the handle pin block first the section $e^2$ occupying the gain $b^3$ and the pin $d$ inserted into place the whole will be firmly held together. And that the matter of changing blades is easily and quickly done is also evident. Hence any number of blades of whatever shapes and sizes may be adapted to one and the same handle and when one should be worn or broken or that might for any other cause be desired to be changed the same may be quickly and easily done.

Having thus fully described my invention, what I claim as new, and desire to secure by Letters Patent, is—

A handle, a longitudinal opening in said handle, a gain in one side of said opening, a transverse hole through said handle, a blade having a shank adapted to fit said longitudinal opening, a keeper provided with projection to catch in said shank, a pin block on said keeper, a hole in said pin block and a pin adapted to pass through transverse hole in said handle and engaging with said hole in said pin block securing all together as set forth.

That I claim the foregoing I have, this 4th day of August, 1892, hereunto subscribed my name in the presence of two witnesses.

WILLIAM WEDEKIND.

Witnesses:
JOE TUTON,
CHARLEY WEDEKIND.